United States Patent [19]
Sugiyama

[11] Patent Number: 4,882,597
[45] Date of Patent: Nov. 21, 1989

[54] LIQUID JET RECORDING APPARATUS HAVING SEPARATE MOTORS FOR DRIVING A LIQUID HEAD AND A LIQUID RESERVOIR

[75] Inventor: Hiroshi Sugiyama, Tokyo, Japan

[73] Assignee: Canon Kabushiki Kaisha, Tokyo, Japan

[21] Appl. No.: 304,897

[22] Filed: Feb. 1, 1989

Related U.S. Application Data

[63] Continuation of Ser. No. 233,955, Aug. 15, 1988, abandoned, which is a continuation of Ser. No. 26,177, Mar. 16, 1987, abandoned.

[30] Foreign Application Priority Data

Mar. 20, 1986 [JP] Japan .................................. 61-60861

[51] Int. Cl.[4] .......................... G01D 15/16; B41J 3/04
[52] U.S. Cl. ............................ 346/140 R; 346/139 B
[58] Field of Search ................ 346/140, 139 R, 139 B

[56] References Cited

U.S. PATENT DOCUMENTS

| | | | |
|---|---|---|---|
| 3,449,754 | 6/1969 | Stutz | 346/139 R X |
| 3,452,361 | 6/1969 | Williams | 346/140 |
| 4,342,041 | 7/1982 | Kasugayama | 346/140 |
| 4,477,823 | 10/1984 | Matsufuji et al. | 346/140 R |
| 4,581,618 | 4/1986 | Watanabe et al. | 346/134 |
| 4,590,495 | 5/1986 | Okamura | 346/140 R |
| 4,631,556 | 12/1986 | Watanabe et al. | 346/140 R |
| 4,677,448 | 6/1986 | Mizusawa et al. | 346/140 R |

FOREIGN PATENT DOCUMENTS 2329710 1/1975 Fed. Rep. of Germany .

*Primary Examiner*—Joseph W. Hartary
*Attorney, Agent, or Firm*—Fitzpatrick, Cella, Harper & Scinto

[57] ABSTRACT

A liquid jet recording apparatus is provided with a recording head for discharging liquid to thereby effect recording, a carriage movable with the recording head mounted thereon, a first motor for driving the carriage, a tank for storing therein the liquid to be supplied to the recording head, a pedestal, movable with the tank mounted thereon, and a second motor for driving the pedestal.

20 Claims, 3 Drawing Sheets

LIQUID JET RECORDING APPARATUS HAVING SEPARATE MOTORS FOR DRIVING A LIQUID HEAD AND A LIQUID RESERVOIR

This application is a continuation of application Ser. No. 233,955 filed Aug. 15, 1988, now abandoned, which is a continuation of application Ser. No. 026,177, filed Mar. 16, 1987, now abandoned.

BACKGROUND OF THE INVENTION

1. Field of the Invention

This invention relates to a liquid jet recording apparatus, and more particularly to a liquid jet recording apparatus which effects recording on a recording medium by flying liquid droplets discharged from a recording head.

2. Related Background Art

The recording apparatus of this type is generally such that the recording head is caused to scan once or more along the recording medium, whereby a recorded image is obtained. As regards means for storing therein a recording liquid to be supplied to the recording head, there are the type (1) which is fixed to the body of the recording apparatus and the type (2) which is mounted on a movable pedestal with the recording head.

However, in a case where the scanning distance of the recording head is considerably long, that is, in the case of a recording medium of large size such as format A2 or A1 having a great recording width, the length of the supply tube to the recording head is too great in the former fixed type (1), and this leads to many inconveniences. Therefore, there is the tendency that use is often made of type (2) in which the storage means is moved with the recording head.

In the case of the above fixed type of recording apparatus, it is necessary to endow the supply tube with such a degree of flexibility that it will not be an obstacle during the scanning of the recording head; too great a length of the supply tube leads to a problem that the line resistance may increase and air may stagnate in the tube.

FIG. 3 of the accompanying drawings show an example of the recording apparatus of the type in which the liquid storing means is moved with the recording head.

In FIG. 3, reference numeral 1 designates a recording head, and reference numeral 2 denotes a tank for supplying recording liquid. The recording head 1 and tank 2 are both fixed to a carriage 3, and the recording head 1 is supplied with the recording liquid from the tank 2 through a supply tube 4. Reference numeral 5 designates guide members for movably guiding the carriage 3 along a recording sheet 6, and reference numeral 7 denotes a motor for moving the carriage 3. The opposite ends of a wire 10 extended between a drive pulley 8 provided on the motor 7 and a driven pulley 9 are fixed to the carriage 3, and the recording head 1 can be caused to scan by these driving devices and in the meantime, the liquid can be discharged to accomplish recording.

However, in the apparatus of such type in which the tank 2 which is the recording liquid reservoir means is moved with the recording head 1, as the amount of recording liquid stored in the tank 2 increases, the frequency of replenishment of recording liquid in the liquid reservoir means can desirably be decreased, but a very precise operation is required in the scanning by the recording head 1 in order to obtain a recording of high quality, and consequently the output of drive motor 7 must be increased. The increase in the size of the liquid reservoir means causes an increase in the total weight of the recording head and the liquid reservoir means and as the result, the increase in the total weight thereof causes an increase in the total inertia of the recording head etc., so that the accuracy with which the recording head can be stopped is degraded. In such a respect, it is difficult to achieve an increased amount of recording liquid stored in the tank 2.

SUMMARY OF THE INVENTION

It is the object of the present invention to solve the above-noted problems peculiar to the prior art and to provide a liquid jet recording apparatus in which the recording liquid reservoir means is of the movable type and moreover the scanning by the recording head can be accomplished highly accurately without resorting to a high out and which is suitable for recording of large-size sheets.

To achieve such objectives, the present invention is provided which relates to a liquid jet recording apparatus characterized by a recording head for discharging a liquid to thereby effect recording, first movable means movable with the recording head mounted thereon, first drive means for driving the first movable means, means for storing therein the liquid to be supplied to the recording head, second movable means movable with the storing means mounted thereon, and second drive means for driving the second movable means.

DESCRIPTION OF THE PREFERRED EMBODIMENT

An embodiment of the present invention will hereinafter be described in detail with reference to the drawings.

Figure 1:
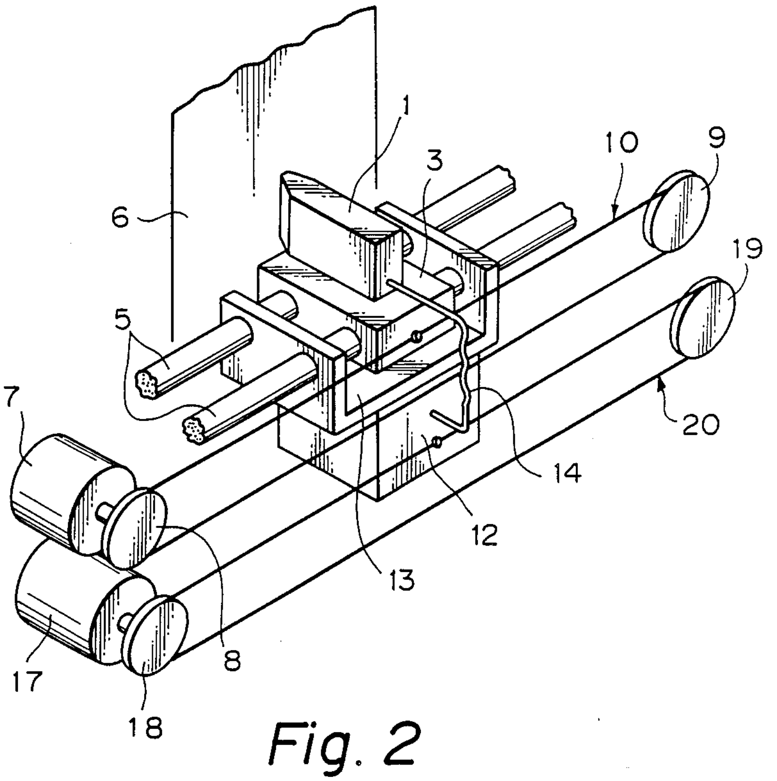
FIG. 1 is a perspective view showing an example of the construction of the liquid jet recording apparatus of the present invention.
Figure 2:
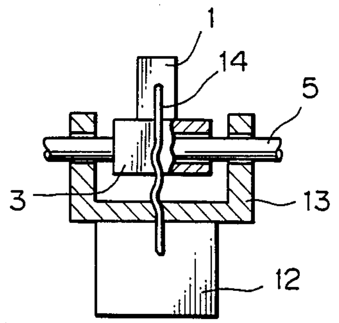
FIG. 2 is a partly broken-away cross-sectional view showing the relation between the movable pedestal for moving the recording liquid supply means and the carriage in the apparatus of FIG. 1.
Figure 3:
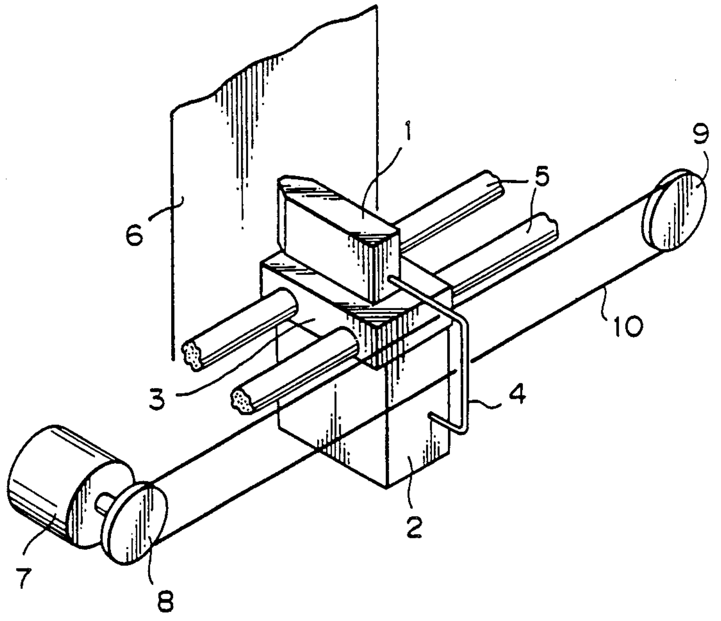
Fig. 3 PRIOR ART
FIG. 3 is a perspective view showing an example of the construction of the liquid jet recording apparatus according to the prior art.

Referring to FIG. 1 which shows an embodiment of the present invention, reference numeral 12 designates a recording liquid tank, and reference numeral 13 denotes a movable pedestal mounting the recording liquid tank 12 thereon. The movable pedestal 13 and a carriage 3 mounting a recording head 1 thereon are both slidably supported on guide members 5, but as shown in FIG. 2, the movable pedestal 13 and the carriage 3 are supported independently of each other.

Reference numeral 14 designates a liquid supply tube for supplying recording liquid from the tank 12 to the recording head 1. The liquid supply tube 14 is formed of a flexible material so that fine displacement of the relative position thereof is permitted between the recording head 1 and the tank 12.

Reference numeral 17 denotes a drive motor for moving the tank 12 with the movable pedestal 13, reference numeral 18 designates a drive pulley, and reference numeral 19 denotes a driven pulley. The opposite ends of a wire 20 extended between the drive pulley 18 and the drive pulley 19 are fixed to the movable pedestal 13, whereby the moval pedestal 13 is movable along the guide members 5.

In the liquid jet recording apparatus thus constructed, when recording is to be carried out, the carriage 3 is driven at a predetermined spring by a motor 7 and is scanned along a recording sheet 6 by the recording head 1, whereby recording is accomplished, and simultaneously therewith, the movable pedestal 13 is driven at a speed substantially equal to said predetermined speed by the motor 17.

In this case, in the driving of the carriage 3 by the motor 7, a highly accurate movement speed is required so that the recording head 1 effects accurate scanning to accomplish recording of high quality, but such high accuracy is not required for the driving of the movable pedestal 13 by the motor 17.

Accordingly, the movement of the movable pedestal need only be carried out within such a range that the carriage 3 and the movable pedestal 13 do not contact each other or any excessive stress is not produced in the liquid supply tube 14, and in this case, the supply tube 14 is flexible and therefore, the joined state thereof is not affected by any deviation of movement between the carriage 3 and the movable pedestal 13.

Thus, it has been found that the carriage driving motor 7 need not be of a high output because the weight to be borne by it is relatively light, while the movable pedestal driving motor 17 for moving the tank 12 does not require as high an accuracy as that of the motor 7 even if it is of a high output.

Figure 4:
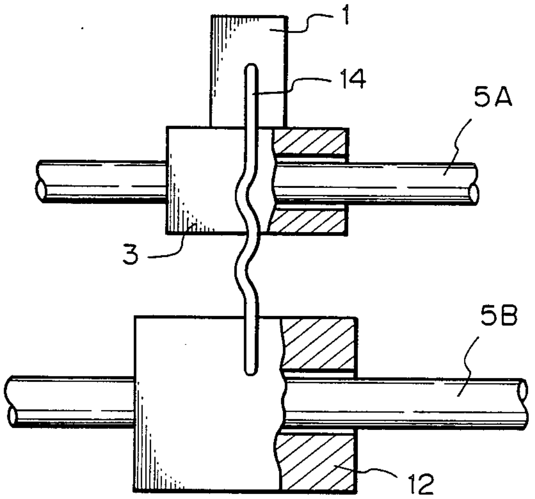
FIG. 4 is a rear view of another embodiment according to the present invention.

Further, although in the embodiment shown in FIG. 2, the guide member 5 is used as a common guide for the movement of the recording head 1 and the tank 12, the recording head 1 and the tank 12, as shown in FIG. 4, may be independently guided by two guide members 5A and 5B arranged in parallel with each other.

According to the present invention, as described above, in a liquid jet recording apparatus provided with recording liquid reservoir means of the movable type, the recording liquid storing capacity of the recording liquid reservoir means can be made sufficiently great without increasing the output of the drive source for the carriage mounting the recording head thereon and moreover, the recording supply path may be short and therefore, recording liquid can be smoothly supplied to the recording head, and recording of high accuracy and high quality can be accomplished even for recording mediums of large sizes.

I claim:

1. A liquid jet recording apparatus comprising:
a recording head for discharging a liquid;
first moving means for moving said recording head along a recording medium;
storing means for storing the liquid to be supplied to said recording head; and
second moving means for moving said storing means independently from said first moving means in the same direction in which said first moving means moves said recording head.

2. A liquid jet recording apparatus according to claim 1, further comprising:
first driving means for driving said first moving means; and
second driving means for driving said second moving means.

3. A liquid jet recording apparatus according to claim 2, wherein each of said first and second driving means comprises a driving motor and a wire for transmitting the driving force of said driving motor to its respective moving means.

4. A liquid jet recording apparatus according to claim 1, further comprising a single guide member for supporting said first and second moving means.

5. A liquid jet recording apparatus according to claim 4, wherein said second moving means is supported at at least two positions along said single guide member by said single guide member, and said first moving means is supported between said two positions by said single guide member.

6. A liquid jet recording apparatus according to claim 1, further comprising separate first and second guide means for respectively supporting said first and second moving means.

7. A liquid jet recording apparatus according to claim 1, wherein said first and second moving means move said recording head and said storing means at substantially the same speed.

8. A liquid jet recording apparatus according to claim 1, further comprising a flexible supply tube for connecting said recording head and said storing means.

9. A liquid jet recording apparatus according to claim 8, wherein said first and second moving means move said recording head and storing means so as to prevent excessive stress on said flexible supply tube.

10. A liquid jet recording apparatus according to claim 8, wherein said recording head and said storing means can move at different speeds without producing excess stress on said flexible supply tube.

11. A liquid jet recording apparatus comprising:
a recording head for discharging a liquid;
first moving means for moving said recording head along a recording medium;
storing means for storing the liquid to be supplied to said recording head; and
second moving means separate from said first moving means for moving said storing means in the same direction in which said first moving means moves said recording head.

12. A liquid jet recording apparatus according to claim 11, further comprising:
first driving means for driving said first moving means; and
second driving means for driving said second moving means.

13. A liquid jet recording apparatus according to claim 12, wherein each of said first and second driving means comprises a driving motor and a wire for transmitting the driving force of said driving motor to its respective moving means.

14. A liquid jet recording apparatus according to claim 11, further comprising separate first and second guide members for respectively supporting said first and second moving means.

15. A liquid jet recording apparatus according to claim 11, further comprising a single guide member for supporting said first and second moving means.

16. A liquid jet recording apparatus according to claim 15, wherein said second moving means is supported at at least two positions along said single guide member by said single guide member, and said first moving means is supported between said two positions by said single guide member.

17. A liquid jet recording apparatus according to claim 11, further comprising a flexible supply tube for connecting said recording head and said storing means.

18. A liquid jet recording apparatus according to claim 17, wherein said first and second moving means move said recording head and storing means so as to prevent excessive stress on said flexible supply tube.

19. A liquid jet recording apparatus according to claim 17, wherein said recording head and said storing means can move at different speeds without producing excessive stress on said flexible supply tube.

20. A liquid jet recording apparatus according to claim 11, wherein said first and second moving means move said recording head and said storing means at substantially the same speed.

* * * * *

UNITED STATES PATENT AND TRADEMARK OFFICE
CERTIFICATE OF CORRECTION

PATENT NO. : 4,882,597

DATED : November 21, 1989

INVENTOR(S) : HIROSHI SUGIYAMA

It is certified that error appears in the above-identified patent and that said Letters Patent is hereby corrected as shown below:

COLUMN 1

Line 34, "type (2)" should read --type (2),--.
Line 42, "show" should read --shows--.

COLUMN 2

Line 18, "high out" should read --high output--.

COLUMN 3

Line 2, "drive pulley 19" should read --driven pulley 19--.
Line 3, "moval pedestal 13" should read --movable pedestal 13--.
Line 7, "predetermined spring" should read --predetermined speed--.
Line 19, "movable pedestal" should read --movable pedestal 13--.

UNITED STATES PATENT AND TRADEMARK OFFICE

CERTIFICATE OF CORRECTION

PATENT NO. : 4,882,597

DATED : November 21, 1989

INVENTOR(S) : HIROSHI SUGIYAMA

It is certified that error appears in the above-identified patent and that said Letters Patent is hereby corrected as shown below:

COLUMN 4

Line 33, "excess stress" should read --excessive stress--.

Signed and Sealed this

Thirteenth Day of August, 1991

*Attest:*

HARRY F. MANBECK, JR.

*Attesting Officer*

*Commissioner of Patents and Trademarks*